UNITED STATES PATENT OFFICE.

GEORGE RAVENSHEAR, OF LONDON, ENGLAND.

TARGET.

1,223,291. Specification of Letters Patent. Patented Apr. 17, 1917.

No Drawing. Application filed August 24, 1915. Serial No. 47,909.

*To all whom it may concern:*

Be it known that I, GEORGE RAVENSHEAR, a subject of the King of the United Kingdom of Great Britain and Ireland, residing at 39 Broadway, West Ealing, Middlesex, England, surveyor, have invented a new and useful Target, of which the following is a specification.

In a co-pending application of even date herewith I have described a target which in place of the usual bull's-eye with or without surrounding circles is provided with representations portraying in a realistic manner human figures, animals or other animate or inanimate objects, the essential feature of said invention consisting in that the representations of the human figures or objects are portrayed in correct sizes mathematically proportioned or calculated so that the size of the figure on the target when viewed at a comparatively short range will appear to the marksman as if it were seen by him in real life at a much greater range and in which the vital parts of the figure on the target are separated by means of inclosing lines so that said figure is divided into sections for the purpose of allotting to them higher scoring values.

Now my present invention consists of a target of the aforesaid kind in which by the use of two colors only the figure or object and its immediate surroundings will appear to the marksman exactly as said figure and surroundings would be seen from a distance as in actual warfare for example.

From numerous experiments and observations I have made on this subject in various parts of the country I have found that instead of having to use three, four or more colors in order to produce correct natural color targets I am enabled to produce them by the use of two colors only.

Persons, animals, lifeless things or objects when seen from a distance exhibit a practically uniform appearance as regards color and are surrounded by the natural color of the immediate area against or on which they may be immediately standing or resting. I have observed that not only do the objects when seen at a distance of two hundred yards or more lose the variety of coloring which they possess when viewed closely but that a color which at a short distance matches the appearance of the distant object is entirely different from that of the object itself when seen at close range. Thus khaki at a distance of say three hundred yards is scarcely distinguishable from black when seen at that distance. The human eye is also limited as regards range of vision when focused on an object at a distance of one hundred or two hundred yards or more to the immediate surroundings. By applying these discoveries I am able to produce a proper and correct natural effect by the use of two colors only that is to say one color for the natural color of the ground or substance upon which the person or animal or object may be standing or resting and the other color for the object itself.

Therefore in accordance with the present invention I employ a card or other suitable material having a surface colored or tinted to correspond with the natural tint or color of the background or immediate surroundings of the object as settled by observation and have reproduced thereon the person or object in the color which said person or object would appear to the eye of the marksman if viewed from a distance.

It is of the highest importance in the production of expert marksmen that the eye should become accustomed to recognize and to pick out objects under conditions which approximate as closely as possible to actual service conditions. Neither black and white targets nor actual pictures are correct in this respect. In my improved two color target however the object or figure being portrayed as correctly as possible under the natural conditions existing at the specified range becomes visible to the marksman at the range used as it is under real conditions which are usually much less definite and distinct than those given by a black and white target at a similar range.

Thus a valuable training is afforded in detecting the object—as well as in aiming—after the object has been found.

The interest of the recruit or would be marksman is thus stimulated in every possible way the realistic appearance of the target, the system of scoring and the challenge to his ability to find his target under approximately natural conditions cannot fail to create an interest which will materially contribute to his efficiency.

By the use of my improved targets representing persons, animals or objects at specified ranges the recruit or would be marksman is also taught to recognize intuitively the correct range of the distant person or object that he is shooting at and he can also be given special instruction in fixing ranges by finger measurements against the targets.

What I claim is:

1. A two color target for miniature and other ranges comprising a uniformly colored ground and the representation of an object reproduced on said ground in a single color, the colors being such as to excite color sensations similar to those produced when the actual figure is viewed at full range in its natural surroundings, and means for inclosing specific parts of said object.

2. A two color target for miniature and other ranges comprising a uniformly colored card, a realistic representation of an object in a single color on said card, the colors being such as to excite color sensations similar to those produced when the actual figure is viewed at full range in its natural surroundings, and a contrasting line inclosing specific parts of said object.

3. A two color target for miniature and other ranges comprising a uniformly colored background, a representation of a soldier reproduced on said background in a single color, the colors being such as to excite color sensations similar to those produced when a soldier is viewed at full range in his natural surroundings, and a contrasting line or wire embedded in said background to inclose vital parts.

4. A two color target for miniature and other ranges comprising a background in a single tint or color and having a representation thereon of an object in a single tint or color and of a size to correspond with the actual size said object would appear if seen at full range, the colors being such as to excite color sensations similar to those produced when the actual figure is viewed at full range in its natural surroundings and contrasting means for inclosing specific parts of said object.

5. A target for miniature and other ranges comprising a uniformly colored ground and the representation of an object reproduced on said ground in a single color and of a size to correspond with the actual size said object would appear if seen at the full selected range, the colors of said background and object corresponding to the natural colors as they would appear to the eye of the marksman if viewed from a distance and means for inclosing specific parts of said object.

6. A target for miniature and other ranges comprising a uniformly colored ground and the representation of an object reproduced on said ground in a single color and of a size to correspond with the actual size said object would appear if seen at the full selected range, the colors of said background and object corresponding to the natural colors as they would appear to the eye of the marksman if viewed from a distance and contrasting lines for inclosing specific parts of said object for the purpose of allotting to said parts different scoring values.

In testimony whereof I affix my signature in the presence of two witnesses.

GEORGE RAVENSHEAR.

Witnesses:
 CHAS. MORSTATT,
 A. E. WHITE.